United States Patent
Trojosky et al.

(10) Patent No.: US 11,325,157 B2
(45) Date of Patent: May 10, 2022

(54) DEVICE AND METHOD FOR CAPTURING MOVEMENT PATTERNS OF TUMBLER SCREENING MACHINES

(71) Applicant: Allgaier Werke GmbH, Uhingen (DE)

(72) Inventors: Mathias Trojosky, Kirchheim unter Teck (DE); Klaus Hardt, Goppingen (DE)

(73) Assignee: Allgaier Werke GmbH, Uhingen (DE)

( * ) Notice: Subject to any disclaimer, the term of this patent is extended or adjusted under 35 U.S.C. 154(b) by 169 days.

(21) Appl. No.: 16/611,514

(22) PCT Filed: Jul. 5, 2018

(86) PCT No.: PCT/EP2018/068310
§ 371 (c)(1),
(2) Date: Nov. 7, 2019

(87) PCT Pub. No.: WO2019/008124
PCT Pub. Date: Jan. 10, 2019

(65) Prior Publication Data
US 2020/0188957 A1   Jun. 18, 2020

(30) Foreign Application Priority Data
Jul. 6, 2017 (DE) .......................... 102017006388.5

(51) Int. Cl.
*B07B 1/42* (2006.01)
*B07B 1/38* (2006.01)
*B07B 1/40* (2006.01)
*G06T 1/00* (2006.01)
*G06K 9/00* (2022.01)
*B07B 1/46* (2006.01)

(52) U.S. Cl.
CPC ................. *B07B 1/42* (2013.01); *B07B 1/38* (2013.01); *G06K 9/00* (2013.01); *G06T 1/00* (2013.01); *B07B 1/40* (2013.01); *B07B 1/4609* (2013.01); *B07B 2201/02* (2013.01); *B07B 2201/04* (2013.01)

(58) Field of Classification Search
CPC .... B07B 1/38; B07B 1/40; B07B 1/42; B07B 1/4609; G06K 9/00; G06T 1/00

USPC ......................................................... 209/368
See application file for complete search history.

(56) References Cited

U.S. PATENT DOCUMENTS

| | | | | |
|---|---|---|---|---|
| 2001/0012001 A1* | 8/2001 | Rekimoto | ............. | G06F 3/0425 345/173 |
| 2020/0188957 A1* | 6/2020 | Trojosky | ................. | B07B 1/288 |

FOREIGN PATENT DOCUMENTS

| | | | | |
|---|---|---|---|---|
| CN | 101171543 A | * | 4/2008 | |
| DE | 19717306 | | 11/1997 | |
| DE | 10017162 | | 9/2001 | |
| DE | 10017162 A1 | * | 9/2001 | ............. H04N 7/188 |
| DE | 202013001383 | | 3/2013 | |
| EP | 0263062 | | 4/1988 | |
| EP | 0263062 A1 | * | 4/1988 | ........... A61B 5/1105 |
| EP | 1133753 | | 9/2001 | |
| EP | 1133753 A1 | * | 9/2001 | ......... G06F 3/03545 |
| EP | 1981403 | | 10/2008 | |
| EP | 1981403 A1 | * | 10/2008 | ............... G06T 7/73 |
| EP | 2696251 | | 2/2014 | |
| EP | 3525941 A1 | * | 8/2019 | |
| GB | 2244823 | | 12/1991 | |
| GB | 2244823 A | * | 12/1991 | ............... B07B 1/36 |
| WO | 2016057805 | | 4/2016 | |
| WO | WO-2016057805 A1 | * | 4/2016 | ............... B06B 1/16 |
| WO | WO-2016162508 A1 | * | 10/2016 | ............... B60P 1/44 |

OTHER PUBLICATIONS

International Search Report for PCT/EP2018/068310; dated Oct. 12, 2018.

* cited by examiner

*Primary Examiner* — Terrell H Matthews
(74) *Attorney, Agent, or Firm* — Peter A. Nieves; Sheehan Phinney Bass & Green PA

(57) ABSTRACT

A method for recording motion patterns (210) of tumbler screening machines (410) is disclosed, wherein the method comprises applying of an active or passive optical marking (500, 510) at a tumbler screening machine (410), recording an image of the optical marking (500, 510) during operation of the tumbler screening machine (410), establishing image data for a motion curve (200), and internally or externally evaluating the recorded image data and determining machine parameters and diagnosis data. Furthermore, a device for recording motion patterns (210) of tumbler screening machines (410) is introduced.

15 Claims, 2 Drawing Sheets

DEVICE AND METHOD FOR CAPTURING MOVEMENT PATTERNS OF TUMBLER SCREENING MACHINES

CROSS-REFERENCE TO RELATED APPLICATIONS

Figure 1:
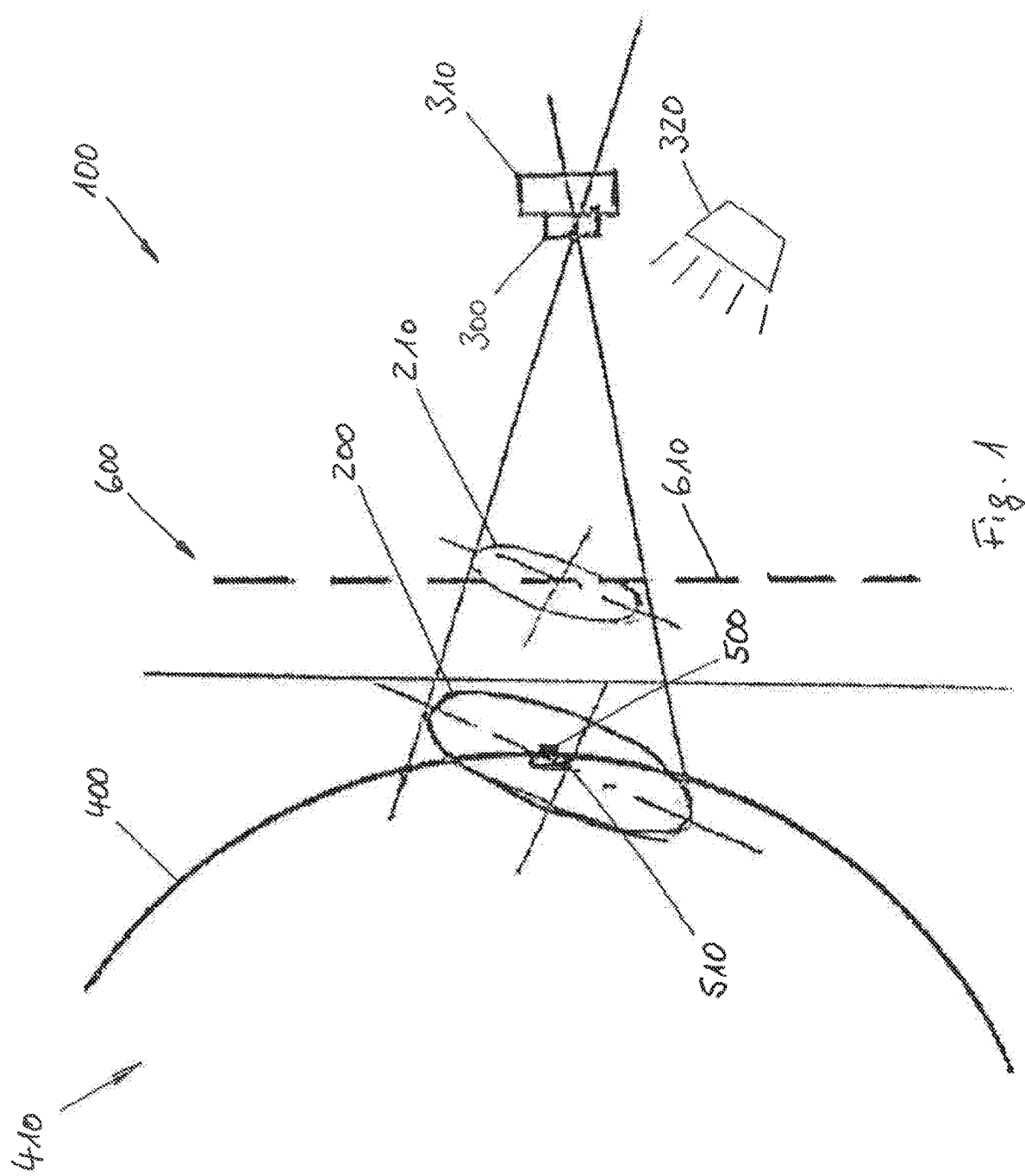

This application is the National. Stage of International Application No, PCT/EP2018/068310, filed Jul. 5, 2018, which claims the benefit of German Patent Application. No. 102017006388.5, filed Jul. 6, 2017. The contents of these prior applications are incorporated by reference herein in their entirety.

The subject matter of the instant invention is a device and a method for recording motion patterns of tumbler screening machines.

Various devices and methods for recording motion patterns of screening machines or tumbler screening machines are known from the state of the art. Such screening machines or tumbler screening machines are used for screening or grading diverse bulk materials from any branches of industry as well as for screening or filtering suspensions.

In screening machines screen cloths are used which, due to different mesh widths, lead to a separation of material into coarse material and fine material and/or in the case of the screening of liquids, to a retaining of solid matter particles exceeding a particular size from the suspension. While the fine material falls or passes through the meshes of the screen cloth and is drawn off underneath the screen deck, the coarse material proceeds on the screen cloth to an outlet at the machine and is drawn off separately there.

For producing a number of fractions from a broad mixture of different particle sizes, machines with a plurality of screen cloths and/or screen decks are built, which are arranged on top of each other and which are, as a rule, arranged from the top to the bottom in accordance with the mesh width of the screens and the size of the particle fractions achievable thereby.

Screening machines of different designs are driven and moved by vibration motors or by gear motors with eccentric drive in a manner corresponding to their design.

Due to this, the screen cloth which is, as a rule, firmly clamped in the machine and/or a screen frame with the stretched screen cloth which is mounted in the machine is moved and accelerated correspondingly by a vibration motor or by an unbalance drive, which results in a grading function.

For evaluating and adjusting the function of the screening machine the knowledge of the machine motion is required and important. For this reason, methods have been developed for measuring and recording the machine motion.

A known method for determining the characteristic machine motion will be explained with the example of a tumbler screening machine.

Due to an incorporated specific mechanism tumbler screening machines perform a three-dimensional motion in space, a so-called tumbling motion. By an overlapping of a tangential machine inclination and a radial machine inclination a solid material applied onto the screen cloth and/or the screen deck is guided in the form of a spiral on a particularly long path over the screen cloth, which results in a known good separation performance of tumbler screening machines, and finally in the discharge of the coarse material at the outer edge of the screen deck. The rotational speed of the screening machine ranges e.g. from 200 to 250 revolutions per minute, in the case of tumbler screening machines preferably at approx. 230 revolutions per minute.

In a lateral top view of the machine surface a point applied on the machine moves in the form of an ellipse in an extensive, two-dimensional projection.

This finding has led to the development of a known method for recording a characteristic ellipse representing a machine motion. In this process, a recording stylus which is applied to be movable in the axial direction is guided for few seconds, e.g. 2 to 5 seconds, over a piece of paper, a so-called curve card, fastened to the machine housing, so that the motion of the machine and of the paper results in the recording of an ellipse by the movably applied recording stylus. The recording stylus may be guided by a round spring which is placed on an area and into which the recording stylus is clamped, or by a tripod. Additionally, in the switched-off state of the machine a horizontal line is drawn on the paper, a so-called curve card, which serves as a reference for determining the inclination of the ellipse to the horizontal.

The ellipse recorded this manner characterizes, by its geometric measurements (a) of the radial thickness, (b) of the eccentricity, and (c) of the tangential inclination as adjusting parameters, the current adjustment of the machine. By means of an adjustment of the machine the adjusting parameters of the machine may be changed and the motion of the solid material as well as the screen performance of the machine may be influenced.

The known method has the following disadvantages:

For the recording of the ellipse for determining the adjusting parameters a mechanical device is required for fastening a recording stylus so as to be movable in the axial direction.

The recording of the ellipse requires sufficient experience and training by an operator and is, since the recording stylus is usually not mounted in a sufficiently stable manner in operational practice, not completely reproducible.

The adjusting parameters must be measured manually from the recorded curve, for which purpose the symmetry line through the ellipse and the horizontal reference line have to be drawn exactly. Only then can the radial thickness of the ellipse, the eccentricity and the tangential inclination of the ellipse be measured. The determination of the adjusting parameters by means of the described manual method is consequently often defective.

The known method is not meaningfully suited for a modern electronic or computational processing or transmitting of the measurement values e.g. from the installation site of the machine by the operator to the manufacturer of the machine for the purpose of consultation and/or service, e.g. in the form of judgement of the machine function or a readjustment of the machine for new products.

An automated integration of a regular or permanent electronic machine monitoring into the electronic measurement control system of the facility operator is not possible with the conventional method.

Various devices and methods for measuring and/or recording the motion of machines are known in the state of the art, few of them for recording the motion of tumbler screening machines.

From the patent document EP 1133753 B1 an electronic writing instrument and a method for recording lines on a writing support are known. This method is used in construction engineering or else for recording notes on computer tablets, but preconditions the contact of the writing instrument with the writing support, as has proved to be a disadvantage also with the above-described conventional method for determining the motion curve of tumbler screening machines.

From the patent application DE 19717306 A1 a device and a method are known which consist substantially in the use of a so-called memo pen in CAD applications. This method also preconditions the direct contact of the pen with a support, whereafter the motion of the pen may be transferred to the computer.

From the utility model DE 202013001383 U1 a method is known for using acceleration sensors which are arranged at the moving object, in particular a human lower jaw. The acceleration values resulting from a motion of the object in the different directions in space as well as the times of motion are converted to distances and directions in space by means of complex mathematical methods. Own studies for using a similar method for the determination of the motion curve of screening machines have shown that the method is related with complex metrological devices and mathematical evaluation methods and that the results obtained are only partly reproducible without a regular calibration of the evaluation software, especially in the case of changing machine parameters.

From the patent application EP 2696251 A2 a method for monitoring rotating machines, in particular wind power plants, is known, which are for this purpose provided with a plurality of sensors for detecting physical parameters. This method is related with the teaching of the above-mentioned utility model. This method also involves the problem that the machine first of all has to be provided in a complex manner with sensors and that the sensor data obtained have to be evaluated. The method is especially suited for monitoring oscillations of machines and for detecting abnormal states with respect to the initial state, e.g. by wear.

From the patent document EP 1981403 B1 a method developed for medical engineering and/or sport science is known, said method using methods of electronic image recognition for recording the motion of the human body. By using several cameras and by observing a plurality of image points applied on the human body, the evaluation of the motion of a human body in the three-dimensional space is enabled.

From the patent application DE 10017162 A1 a device and method for recording repetitive motions by stroboscopic recordings is known, wherein a plurality of images are recorded and combined to motion information. This method preconditions the use of a stroboscopic recording device and a complex image processing of the individual recordings. The determination of parameters of the motion from the recorded images is not described.

From the patent application EP 0263062 A1 a method for recording the motion of objects by using a photo element projection surface and converting a shadow caused by moving objects, in particular experimental animals, to a photoelectric signal is known. This method is complex since a photo element projection surface is required, has to be made available to the user, and has to be applied at the machine if it is used with moving machines. Moreover, this method preconditions an electrical connection of the projection surface with an electronic evaluation system.

It is thus an object of the invention to provide a device and a method by means of which the disadvantages of the state of the art, in particular of the recording of motion curves of tumbler screening machines, are overcome. Specifically, a particularly simple and likewise inexpensive method is to be introduced, which can be performed with means which are practically available to any user nowadays.

This object is solved by the method in accordance with the invention with the features according to claim 1 and by the device with the features of claim 10.

The method for recording motion patterns of tumbler screening machines in accordance with the invention comprises the steps of
1. applying an optical marking at the tumbler screening machine;
2. recording the optical marking during operation of the tumbler screening machine and establishing image data for a motion curve;
3. evaluating the recorded image data.

Advantageously, the optical marking is applied in a region in which the motion of the tumbler screening machine is to be determined. The region may in particular be located at the side of the tumbler screening machine. The region may in particular be located at the moving housing of the tumbler screening machine. It is an advantage of the method that the recording of the motion curves is facilitated and automated, the determination of curve parameters is improved, and a computational processing is enabled.

Advantageously, the optical marking is a passive reading point which is applied to the housing of the tumbler screening machine. The reading point may in particular be glued or painted. The reading point may preferably have a diameter of 1 to 20 mm, particularly preferred of 2 to 6 mm. The reading point may preferably be designed of a bright, in particular white material. The reading point may in particular be designed of paper or adhesive film. The reading point may in a particularly preferred manner be designed in a fluorescent color or a signal color. It is an advantage that the method may be used with an installed tumbler screening machine without interference or structural alterations.

Advantageously, the optical marking is an active light source which is arranged on the housing of the tumbler screening machine. The optical marking may in particular be a dot-shaped active light source, in particular a light emitting diode. The active light source or light emitting diode may in particular be provided with a button cell for power supply, a pressure switch or toggle switch for switching on and off, and a miniature housing for accommodating the components mentioned. The active light source, the components mentioned and the miniature housing may be attached to the housing of the tumbler screening machine in particular with a magnet holder, a hook and loop fastener, a screw connection, bonding, riveting or spot welding.

Advantageously, the recording of the motion of the optical marking during operation of the tumbler screening machine is performed with an electronic image recording device. The electronic image recording device may in particular be a digital camera, a mobile communications terminal or a smartphone with an integrated digital camera. It is an advantage that the operator may use an available smartphone or an available digital camera for recording the motion pattern of the tumbler screening machine.

Advantageously, the recording of the motion of the optical marking during operation of the tumbler screening device is performed at least over a period of one oscillation period of the tumbler screening machine. The recording of the motion may be performed in particular by means of a time-exposed single recording, a multiple-exposed recording series, a time-exposed stroboscopic single recording, or a video recording.

Advantageously, the measurements and the orientation of the recorded motion patterns are determined by comparison with a reference means. The reference means may in particular be an optical reference grid or a water level. The water level may be a water level integrated in the smartphone. The measurements and the orientation of the recorded motion patterns may also be determined by comparison with known measurements of the optical marking.

Advantageously, the recorded motion patterns are evaluated by an internal or external computing unit and/or transmitted by means of a data transmission unit to a diagnosis device for evaluation. Advantageously, in particular the eccentricity, radial thickness and tangential inclination of the recorded motion patterns are determined and especially diagnosis data and/or adjusting parameters of the tumbler screening device are derived therefrom. An advantage of the internal calculation is that the evaluation of the motion patterns and the calculation of the adjusting parameters may also be performed on the smartphone used for recording the motion patterns. An advantage of the external calculation is that the required resources may be provided by the machine manufacturer and that the software required for the evaluation of the motion patterns is not dependent on the operating system of the smartphone used.

Advantageously, optimum adjusting parameters of the tumbler screening machine are calculated from the diagnosis data and are transmitted to a display unit. The display unit may preferably be a display unit of the smartphone. The optimum adjusting parameters of the tumbler screening machine may be represented numerically or graphically, so that the parameters can be transferred manually to the tumbler screening machine and can be adjusted at the tumbler screening machine. The optimum adjusting parameters may also be used by means of a control device directly for controlling the tumbler screening machine, so that the manual transfer and adjustment may be omitted.

The device according to the invention consists of a tumbler screening machine with an optical marking in a region in which the motion of the tumbler screening machine is to be determined. Furthermore, the device in accordance with the invention consists of a digital camera or a smartphone with an integrated digital camera by means of which motion patterns of the tumbler screening machine can be recorded, an evaluation device comprising a computing unit and/or a storage unit by means of which image data for a motion curve can be established and/or diagnosis data and/or adjusting parameters of the tumbler screening machine can be calculated from the recorded motion patterns, and/or a data transmission unit by means of which motion patterns and/or image data can be transmitted to an internal or external computing unit and diagnosis data and/or adjusting parameters can be retransmitted from the internal or external computing unit to the place of the tumbler screening machine, and/or a display unit, in particular a display unit of a smartphone, by means of which the retransmitted data can be represented.

Advantageously, the device further comprises reference means. The reference means may in particular be an optical reference grid and/or a water level. The optical reference grid may be of transparent design and be arranged between the optical marking and the recording device or next to the optical marking. The water level may preferably be a water level integrated in the smartphone. Advantageously, the measurements and the orientation of the recorded motion patterns can be determined by comparison with the reference means.

Advantageously, the electronic image recording device is a digital camera which is suited for the establishing of a time-exposed single recording and/or a multiple-exposed recording series and/or a time-exposed stroboscopic single recording and/or a video recording. The electronic image recording device may in particular also be a mobile communications terminal with an integrated digital camera or a smartphone with an integrated digital camera.

Advantageously, the optical marking is a passive reading point or an active light source, in particular a light emitting diode. The active light source or light emitting diode may be provided with a button cell for power supply, a pressure switch or toggle switch for switching on and off, and a miniature housing. The active light source or light emitting diode may be attached to the housing of the tumbler screening machine with a magnet holder, a hook and loop fastener, a screw connection, bonding, riveting or spot welding.

A preferred embodiment of the instant invention will be explained in detail by means of the drawings.

There show:

FIG. 1 a schematic view of the device in accordance with the invention.

Figure 2:
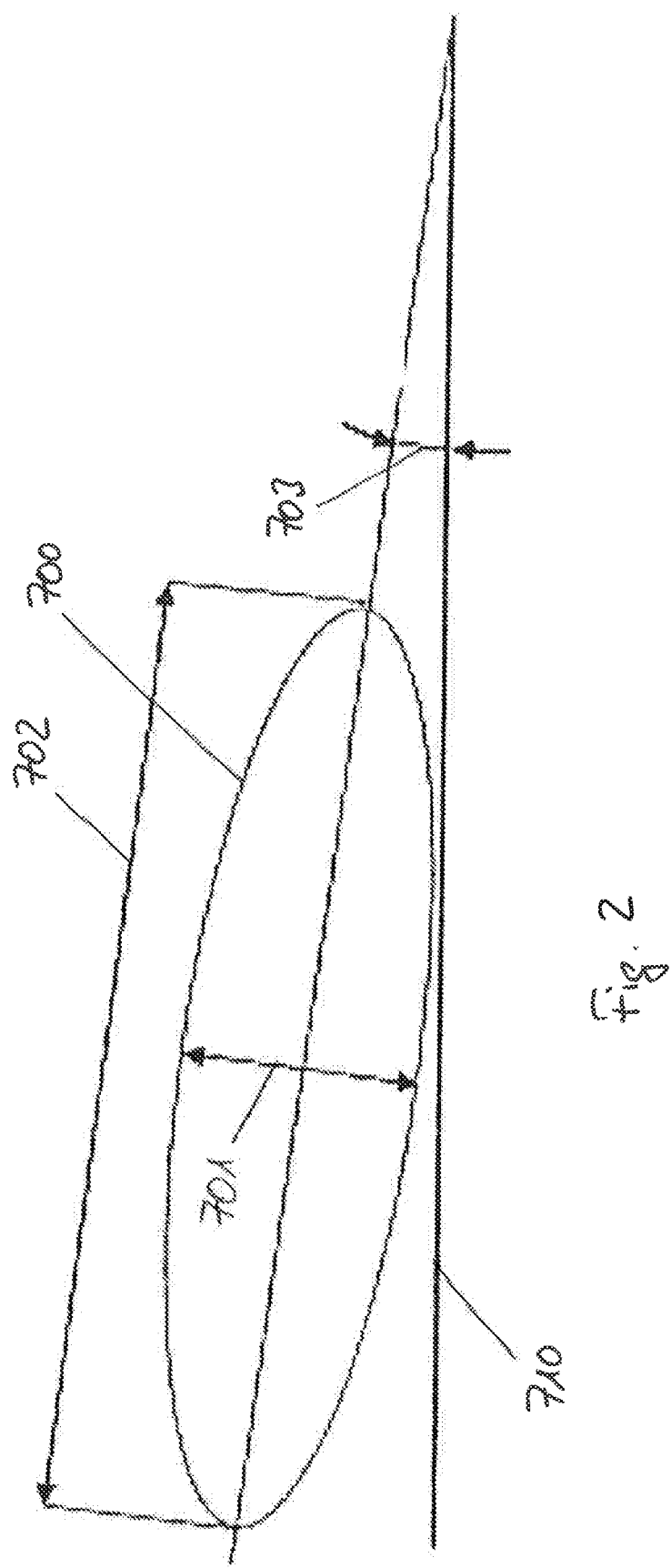

FIG. 2 a schematic view of a motion curve with parameters.

LIST OF REFERENCE NUMBERS 100 device for recording motion patterns
200 motion curve
210 motion pattern
300 digital camera
310 smartphone
400 moving housing
410 tumbler screening machine
500 reading point
510 active light source
600 transparent reference means
610 grid
700 normalized motion curve
701 radial thickness
702 eccentricity
703 tangential inclination
710 horizontal FIG. 1 shows a schematic view of the device 100 for recording motion patterns of a tumbler screening machine in accordance with the invention.

The recording of a motion curve 200 is performed by a digital camera 300 which may be integrated in a smartphone 310. The digital camera 300 is adapted specifically for the recording of moving objects, i.e. for time exposures, serial exposures and video recording. The digital camera may be supported by a light source 320, in particular by a stroboscopic light source for the recording of dynamic processes by means of time exposures or serial exposures.

On a moving housing 400 of an oscillating tumbler screening machine 410 a reading point 500 with a diameter of e.g. 2 to 6 mm is applied, e.g. glued or painted. The reading point 500 should preferably consist of a white material or a material of rich contrast (e.g. paper or adhesive film) against the housing 400, or be designed in a fluorescent color or a signal color.

Alternatively, instead of the passive reading point 500 an active light source of small diameter, e.g. a miniaturized light emitting diode 510 with high intensity, may be arranged on the housing 400, which is, for instance, accommodated in a miniature housing along with a button cell and a switch, wherein the button cell serves as a power supply for the light emitting diode 510. The miniature housing may be provided with a pressure switch for switching the light emitting diode 510 on and off. The miniature housing may be fastened to the housing 400 of the tumbler screening machine 410 with a magnet holder, a hook and loop fastener, a screw connection or some other method.

The reading point 500 is preferably applied at the side of the tumbler screening machine 410, preferably in a region in which the motion of the tumbler screening machine is to be determined. In the case of conventional tumbler screening machines the reading point may, for instance, be applied laterally on the moving basic cylinder.

By means of the digital camera 300 and/or by means of the smartphone 310 a time-exposed recording, a recording series or a video recording is performed during operation of the tumbler screening machine 410, possibly supported by the in particular stroboscopic light source 320, so that the periodic motion of the reading point 500 fills the recording format optimally without parts of the motion curve being cut off. In this process a sufficiently large distance of the camera from the tumbler screening device is chosen, e.g. 300 mm to approx. 1 m, so that the three-dimensional motion of the tumbler screening device in the space does not lead to a substantial perspective distortion of the recording by a changing distance of the reading point 500 from the objective of the digital camera 300.

Due to the duration of the recording of e.g. 1 to 10 seconds and the choice of suitable exposure parameters a high-contrast motion pattern 210 of the periodic motion of the reading point 500 is recorded.

During the duration of recording the digital camera 300 and/or the smartphone 310 is preferably positioned on a static support, so that as slight motion blurring as possible occurs e.g. by "shaking" or vibrations.

In order to infer the real size of the recorded motion pattern 210 from the recording performed, various methods can be applied. Thus, on the one hand, a transparent reference means 600 with a dimensionally accurate grid 610 may e.g. be arranged at a defined distance between the camera 300 and the tumbler screening machine 410. During the recording of the moving reading point 500 the grid 610 is consequently also recorded on the record and/or the recording series or on the video. From the relation of the recorded motion of the moving reading point 500 and the known measures of the grid 610 the extension of the recorded motion curve may be determined. The method, however, has the disadvantage that the distances between the tumbler screening machine 410 and the grid 610 as well as between the grid 610 and the camera 300 have to be referred to for converting the recorded size of the motion pattern 210 to the actual measurements of the motion curve 200.

A determination of the actual measurements of the recorded motion curve 200 may be implemented as follows:

The described reading point 500 of, for instance, bright or fluorescent adhesive film is prepared with an exactly known measure (diameter) (e.g. 10 mm or 15 mm). Likewise, the miniature housing for accommodating the light emitting diode 510 may be designed with an exactly known diameter instead of the reading point 500. Preferably, the miniature housing should have a bright color, wherein the centrally arranged light emitting diode 510 itself, for increasing the contrast, may e.g. be surrounded in a dark or some other color, respectively.

On the long-exposed recording, the recording series or the video recording the reading point 500 will then occur in the form of a broad trace with the defined width of the diameter of the reading point 500. With the width of the trace of the reading point 500 on the photo or video a reference measure exists from which the measures of the motion curve may be determined by means of a ratio calculation. The light emitting diode 510 of small diameter describes a thin line on the recording, which corresponds to the motion curve 200 of the oscillating tumbler screening machine 410.

The determination of the angle of the position of the motion curve may either be performed in that the above-described grid 610 is oriented exactly horizontally, so that the position of the curve with respect to the horizontal becomes visible from the recording.

Pursuant to the state of the art, however, smartphones also offer the possibility of the device-internal determination of the horizontal position of the smartphone and/or the camera ("water level function"). This function of the smartphone is used in an advantageous manner to record, in a combination of the recording function and the water level function, the orientation of the camera 300 and/or the smartphone 310 with respect to the horizontal during recording (horizontal value of the recording), e.g. in that one or several horizontal lines are faded into the recording or in that the value of the angle deviation of the camera with respect to the horizontal during the recording is stored as a data value for the recording performed.

It is further advantageous if the recording or recording series of a motion pattern 210 produced in accordance with the above-described method is performed by means of a smartphone application, a so-called "app", and if especially the recording or recording series is combined with the simultaneous determination of the position of the camera with respect to the horizontal during recording.

The recording or recording series of the motion curve 200 thus established may then be evaluated automatically either internally, i.e. within the smartphone 310 by the app itself, or externally, i.e. after the transmission of the data to a computer center, for instance, at the manufacturer of the machine, by means of suitable graphical and mathematical methods. For this purpose, methods of image or pattern recognition may be used. In this image or pattern recognition and evaluation the motion patterns 210 are first of all converted to motion curves 200 and subsequently to normalized motion curves 700 from which the searched adjusting parameters of the machine, for instance, radial thickness 701, eccentricity 702 and tangential inclination 703 to the horizontal 710, are calculated. Further parameters may be added as a function of the kind and type of the machine.

A normalized motion curve 700 and the parameters mentioned by way of example are illustrated schematically in FIG. 2.

Subsequently, the adjusting parameters determined on a computer of the machine manufacturer or a machine maintenance technician may, directly after their determination, be retransmitted to the smartphone of the operator, so that the operator may directly use the determined data for a judgment of the machine running or for an adjustment or readjustment of the machine. For this purpose the determined adjusting parameters are represented graphically or numerically on the display unit of the smartphone or on another display unit. Alternatively, the machine manufacturer or machine maintenance technician may perform an automated remote maintenance, i.e. transmit the determined adjusting parameters automatically and without assistance of the operator to the machine.

The invention claimed is:

1. A method for recording motion patterns (210) of a tumbler screening machine (410), characterized in that the method comprises the following method steps:
   a. applying an optical marking (500, 510) on the tumbler screening machine (410);

b. recording the optical marking (500, 510) during operation of the tumbler screening machine (410) and establishing image data for a motion curve (200);

c. evaluating the recorded image data.

2. The method according to claim 1, characterized in that the optical marking (500, 510) is applied in a region in which the motion of the tumbler screening machine (410) is to be determined.

3. The method according to claim 1, characterized in that the optical marking is a passive reading point (500) which is applied to the housing (400) of the tumbler screening machine (410).

4. The method according to claim 1, characterized in that the optical marking is an active light source (510) which is arranged on the housing (400) of the tumbler screening machine (410), in particular a light emitting diode, which is provided with a button cell for power supply, a pressure switch or toggle switch for switching on and off, and a miniature housing.

5. The method according to claim 1, characterized in that the recording of the optical marking (500, 510) during operation of the tumbler screening machine (410) is performed with an electronic image recording device, in particular with a digital camera (300) or a smartphone (310) with an integrated digital camera.

6. The method according to claim 5, characterized in that the recording of the optical marking (500, 510) during operation of the tumbler screening machine (410) is performed at least over a period of one oscillation period of the tumbler screening machine and in particular by means of a time-exposed single recording, a multiple-exposed recording series, a time-exposed stroboscopic single recording, or a video recording.

7. The method according to claim 1, characterized in that the measurements and the orientation of the recorded motion patterns (210) are determined by comparison with a reference means (600), in particular with an optical reference grid (610) or with a water level, or by comparison with known measurements of the optical marking (500, 510).

8. The method according to claim 1, characterized in that the recorded motion patterns (210) are evaluated by an internal or external computing unit and/or transmitted by means of a data transmission unit to a diagnosis device for evaluation.

9. The method according to claim 8, characterized in that optimum adjusting parameters of the tumbler screening machine (410) are calculated from the diagnosis data and are transmitted to a display unit, preferably a display unit of the smartphone (310), and are represented numerically or graphically or are, by means of a control device, used directly for controlling the tumbler screening machine (410).

10. A device for performing the method according to claim 1, comprising a tumbler screening machine (410) with an optical marking (500, 510) in a region in which the motion of the tumbler screening machine (410) is to be determined, further comprising a digital camera (300) or a smartphone (310) with an integrated digital camera by means of which motion patterns (210) of the tumbler screening machine (410) can be recorded, an evaluation device comprising a computing unit by means of which image data for a motion curve (200) can be established and/or diagnosis data and/or adjusting parameters of the tumbler screening machine (410) can be calculated from the recorded motion patterns (210), and/or a data transmission unit by means of which motion patterns (210) and/or image data can be transmitted to an internal or external computing unit and diagnosis data and/or adjusting parameters can be retransmitted from the internal or external computing unit to the place of the tumbler screening machine (410), and/or a display unit, in particular a display unit of a smartphone (310), by means of which the retransmitted data can be represented.

11. The device according to claim 10, further comprising reference means (600), in particular an optical reference grid (610) and/or a water level, characterized in that measurements and orientation of the recorded motion patterns (210) can be determined by comparison with the reference means (600).

12. The device according to claim 10, characterized in that the optical marking is a passive reading point (500) or an active light source (510), in particular a light emitting diode, which is provided in particular with a button cell for power supply, a pressure switch or toggle switch for switching on and off, and a miniature housing, and is adapted to be attached to the housing (400) of the tumbler screening machine (410) in particular with a magnet holder, a hook and loop fastener, a screw connection, bonding, riveting or spot welding.

13. A computer program for performing the method according to claim 1 in a computing unit, in particular an app for performing the method in the computing unit of a smartphone (310).

14. A computing unit in which a computer program and/or an app according to claim 13 is capable of running.

15. A data storage device for storing a computer program and/or an app according to claim 13.

* * * * *